US010648914B2

(12) United States Patent
Nagai et al.

(10) Patent No.: US 10,648,914 B2
(45) Date of Patent: May 12, 2020

(54) OPTICAL SAMPLE DETECTION SYSTEM

(71) Applicant: KONICA MINOLTA, INC, Chiyoda-ku (JP)

(72) Inventors: Fumio Nagai, Hachioji (JP); Tetsuya Noda, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/773,910

(22) PCT Filed: Oct. 25, 2016

(86) PCT No.: PCT/JP2016/081592
§ 371 (c)(1),
(2) Date: May 4, 2018

(87) PCT Pub. No.: WO2017/082043
PCT Pub. Date: May 18, 2017

(65) Prior Publication Data
US 2018/0321152 A1    Nov. 8, 2018

(30) Foreign Application Priority Data
Nov. 11, 2015   (JP) .................. 2015-221070

(51) Int. Cl.
G01N 21/64     (2006.01)
G02B 5/04      (2006.01)
G01N 21/552    (2014.01)

(52) U.S. Cl.
CPC ......... *G01N 21/648* (2013.01); *G01N 21/553* (2013.01); *G01N 21/6428* (2013.01); *G02B 5/04* (2013.01)

(58) Field of Classification Search
CPC ............. G01N 21/553; G01N 21/6428; G01N 21/648; G02B 5/04
See application file for complete search history.

(56) References Cited

U.S. PATENT DOCUMENTS

2002/0126290 A1    9/2002   Naya
2008/0074671 A1*   3/2008   Ohtsuka ............. G01N 21/6428
                                                          356/455

(Continued)

FOREIGN PATENT DOCUMENTS

EP     2672273       12/2013
JP     2006-308511   11/2006

(Continued)

OTHER PUBLICATIONS

Partial supplementary Search Report dated Oct. 9, 2018 issued in European Patent Application No. 16864007.6.

(Continued)

*Primary Examiner* — Marcus H Taningco
(74) *Attorney, Agent, or Firm* — Cozen O'Connor

(57) ABSTRACT

An optical sample detection system includes: a sensor chip including a dielectric member, a metal film adjacent to an upper surface of the dielectric member, a reaction layer adjacent to an upper surface of the metal film, and a lid member disposed on an upper surface of the reaction layer; a chip holding unit for holding the sensor chip; and a light projecting unit that irradiates the metal film with excitation light through the dielectric member. A sample is detected by irradiating the metal film with excitation light through the dielectric member. The lid member is wider than the dielectric member in an optical path cross section of the excitation light.

20 Claims, 14 Drawing Sheets

(56) References Cited

U.S. PATENT DOCUMENTS

| | | |
|---|---|---|
| 2010/0225915 A1 | 9/2010 | Hong et al. |
| 2011/0128546 A1* | 6/2011 | Couillard ............. G01N 21/553 356/445 |
| 2011/0171746 A1* | 7/2011 | Fontaine ............. G01N 21/553 436/164 |
| 2013/0240734 A1 | 9/2013 | Booksh et al. |
| 2015/0011015 A1* | 1/2015 | Matsuo ................ G01N 21/648 436/501 |
| 2017/0016823 A1 | 1/2017 | Tamura et al. |

FOREIGN PATENT DOCUMENTS

| | | |
|---|---|---|
| JP | 2009-204486 | 9/2009 |
| JP | 2010-19765 | 1/2010 |
| JP | 2012-202911 | 10/2012 |
| JP | 2014-32148 | 2/2014 |
| JP | 2014-167479 | 9/2014 |
| WO | WO 02/073171 | 9/2002 |
| WO | WO 2005/095927 | 10/2005 |
| WO | WO 2015/129615 | 9/2015 |

OTHER PUBLICATIONS

Search Report dated Jan. 21, 2019 issued in European Patent Application No. 16864007.6.

* cited by examiner

— 1 —

OPTICAL SAMPLE DETECTION SYSTEM

RELATED APPLICATIONS

This is a U.S. National Phase Application under 35 USC 371 of International Application PCT/JP2016/081592 filed on Oct. 25, 2016.

This application claims the priority of Japanese application no. 2015-221070 filed Nov. 11, 2015, the entire content of which is hereby incorporated by reference.

TECHNICAL FIELD

The present invention relates to an optical sample detection system for detecting a measurement target substance included in a sensor chip using a surface plasmon resonance apparatus applying a surface plasmon resonance (SPR) phenomenon, a surface plasmon-field enhanced fluorescence spectroscopic apparatus based on principle of surface plasmon-field enhanced fluorescence spectroscopy (SPFS), or the like.

BACKGROUND ART

Conventionally, in a case of detecting an extremely minute substance, various sample detection apparatuses capable of detecting such a substance by applying a physical phenomenon of the substance have been used.

One of such sample detection apparatuses is a surface plasmon resonance apparatus (hereinafter, referred to as "SPR apparatus"), for example, for detecting an extremely minute analyte in a living body by applying a phenomenon (surface plasmon resonance (SPR) phenomenon) that obtains a high light output by resonance of electrons and light in a fine region at a nanometer level or the like.

In addition, a surface plasmon-field enhanced fluorescence spectroscopic apparatus (hereinafter, referred to as "SPFS apparatus") capable of detecting an analyte with higher accuracy than the SPR apparatus based on principle of surface plasmon-field enhanced fluorescence spectroscopy (SPFS) applying a surface plasmon resonance (SPR) phenomenon is also one of such sample detection apparatuses.

This surface plasmon-field enhanced fluorescence spectroscopy (SPFS) obtains an effect of enhancing an electric field of surface plasmon light by generating surface plasmon light (compressional wave) on a surface of a metal film under a condition that excitation light such as laser light emitted from a light source undergoes attenuated total reflectance (ATR) on the surface of the metal film to increase the amount of photons possessed by the excitation light emitted from the light source by dozens of times to several hundreds of times.

FIG. 13 is a schematic configuration diagram for explaining a configuration of a conventional SPFS system.

A conventional SPFS system 100 includes a sensor chip 114 including a prism-shaped dielectric member 102 having a substantially trapezoidal vertical cross section, a metal film 104 formed on a horizontal upper surface 102a of the dielectric member 102, a reaction layer 106 formed on an upper surface of the metal film 104, and a channel forming member 110 and a channel lid member 112 forming a channel 108 so as to surround the reaction layer 106. The sensor chip 114 is loaded in a sensor chip loading portion 116 of an SPFS apparatus 101.

The reaction layer 106 of the sensor chip 114 has a solid phase film for capturing an analyte labeled with a fluorescent substance. By feeding a sample liquid containing the analyte to the channel 108, the analyte can be fixed onto the metal film 104.

In addition, a light receiving unit 120 of the SPFS apparatus 101 is disposed above the sensor chip 114 in order to measure the intensity of fluorescence 118 emitted by a fluorescent substance excited by surface plasmon light (compressional wave) generated on the metal film 104.

In addition, as illustrated in FIG. 13, a light source 122 of the SPFS apparatus 101 is disposed on one side surface (incidence surface 102b) side below the dielectric member 102. Excitation light 124 emitted from the light source 122 is incident on an incidence surface 102b of the dielectric member 102 from a lower portion of an outside of the dielectric member 102. The metal film 104 formed on the upper surface 102a of the dielectric member 102 is irradiated with the excitation light 124 through the dielectric member 102.

In the conventional SPFS system 100 configured as described above, by emitting the excitation light 124 from the light source 122 toward the metal film 104, surface plasmon light (compressional wave) is generated on a surface of the metal film 104. This surface plasmon light (compressional wave) excites a fluorescent substance labeling an analyte, and the fluorescence 118 is emitted. The fluorescence 118 is detected by the light receiving unit 120, and the amount of analyte is calculated based on the light amount of the fluorescence 118.

In such SPFS measurement, the light amount of the fluorescence 118 is lower than the excitation light amount by about ten digits. Therefore, even if a small amount of the excitation light 124 is incident on the light receiving unit 120, an S/N ratio deteriorates, and detection accuracy deteriorates. Therefore, it is important to reduce stray light.

As illustrated in FIG. 13, the excitation light 124 is incident from the incidence surface 102b of the dielectric member 102, is then reflected by the metal film 104, and is emitted from an emission surface 102c of the dielectric member 102.

However, as illustrated in FIG. 13, a part of the excitation light 124 is reflected by the emission surface 102c of the dielectric member 102, and there is emission surface reflected light 124b emitted from the incidence surface 102b of the dielectric member 102.

As illustrated in FIG. 13, when the emission surface reflected light 124b is incident on the channel lid member 112, the emission surface reflected light 124b becomes light guided in the channel lid member 112. If the emission surface reflected light 124b exists in a visual field range of the light receiving unit 120, autofluorescence in the channel lid member 112 is detected, leading to deterioration of an S/N ratio.

Incidentally, the emission surface reflected light 124b usually has a light amount of about 4% of the excitation light 124, and this amount is sufficiently large with respect to the fluorescence 118. Therefore, the emission surface reflected light 124b can be said to be stray light to be removed.

In order to remove such stray light, in Patent Literature 1, as illustrated in FIG. 14, a light absorbing portion 126 for absorbing metal film reflected light reflected by the metal film 104 is disposed in an optical path of the dielectric member 102.

In addition, in Patent Literature 2, as illustrated in FIG. 15, by disposing an excitation light cut filter (wavelength filter) 128 for removing scattered light and reflected light in the sensor chip 114 on an upper surface of the sensor chip 114, the excitation light 124 is cut.

CITATION LIST

Patent Literature

Patent Literature 1: JP 2014-167479 A
Patent Literature 2: JP 2012-202911 A

SUMMARY OF INVENTION

Technical Problem

However, with such a configuration as in Patent Literature 1, the metal film reflected light is not 100% absorbed by the light absorbing portion 126, minute reflected light exists in the light absorbing portion 126, and such reflected light stray light cannot be removed completely.

In addition, with such a configuration as illustrated in FIG. 13, emission surface reflected light or the like emitted to an outside of the dielectric member cannot be cut, and stray light is still generated.

Furthermore, in a case where the width of the channel lid member 112 is larger than the width of the dielectric member 102 as in Patent Literature 1, as described above, stray light generated is incident on the channel lid member 112, having a large influence on measurement accuracy.

In view of such a circumstance, an object of the present invention is to provide an optical sample detection system capable of measuring a sample with high accuracy by removing stray light incident on a lid member such as a channel lid member and preventing light derived from excitation light and having a larger light amount than fluorescence from existing in a visual field range of a light receiving unit.

Solution to Problem

The present invention has been achieved in order to solve the problems in related art as described above. In order to achieve at least one of the above objects, an optical sample detection system reflecting one aspect of the present invention includes:

a sensor chip including:
a dielectric member;
a metal film adjacent to an upper surface of the dielectric member;
a reaction layer adjacent to an upper surface of the metal film; and
a lid member disposed on an upper surface of the reaction layer;
a chip holding unit for holding the sensor chip; and
a light projecting unit that irradiates the metal film with excitation light through the dielectric member, the optical sample detection system detecting a sample by irradiating the metal film with the excitation light through the dielectric member, wherein
the lid member has a larger width than the width of the dielectric member in an optical path cross section of the excitation light, and
emission surface reflected light emitted to an outside of the dielectric member after the excitation light is reflected by an emission surface of the dielectric member is not incident on the lid member within a measurement scanning angle of the excitation light.

Advantageous Effects of Invention

The present invention is designed such that emission surface reflected light derived from excitation light having a larger light amount than fluorescence is not incident on a lid member. Therefore, the emission surface reflected light is not guided into the lid member, an S/N ratio can be largely improved, and a sample can be measured with high accuracy.

DESCRIPTION OF EMBODIMENTS

Hereinafter, an embodiment of the present invention will be described in more detail based on the drawings.

Figure 1:
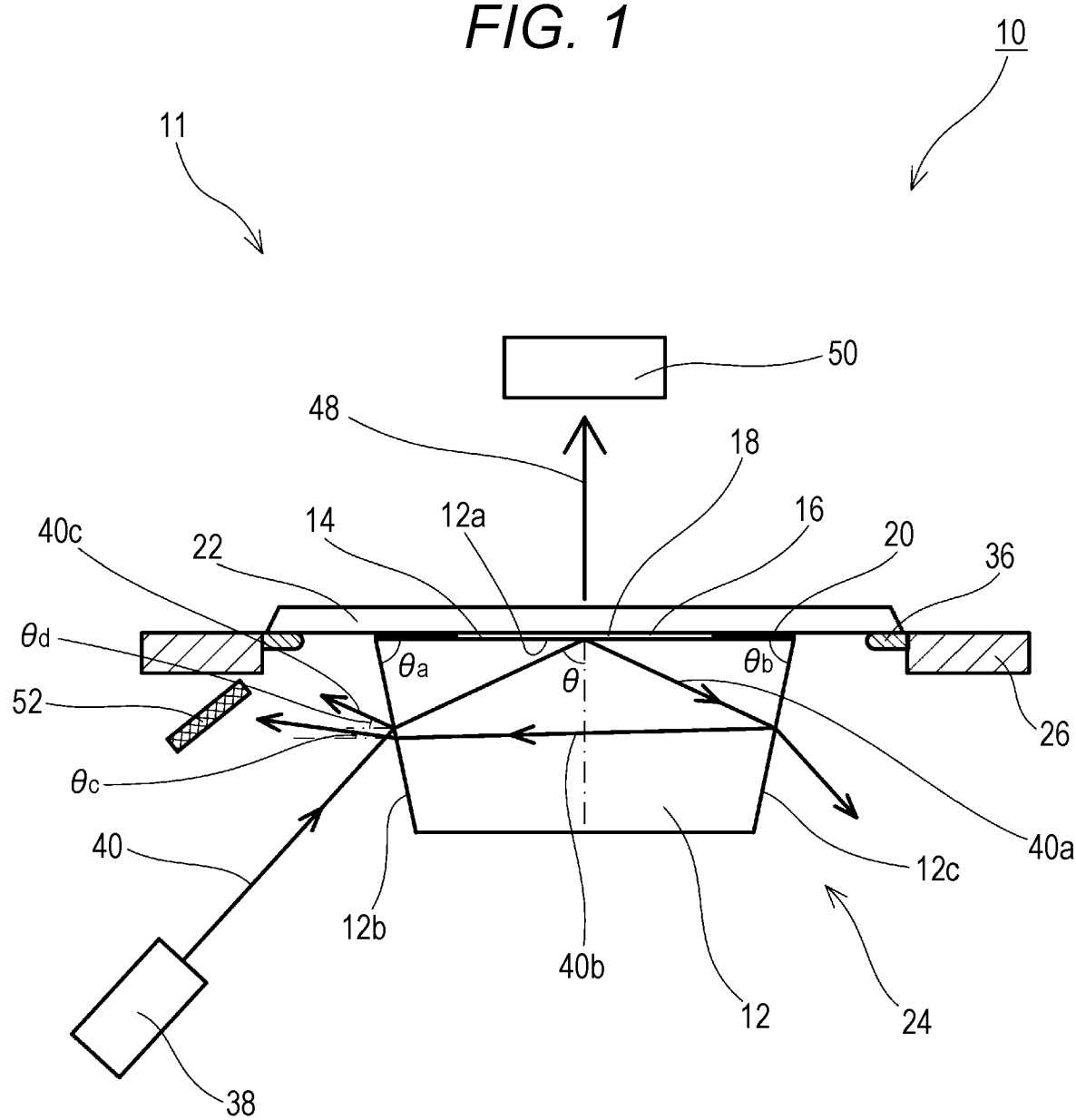
FIG. 1 is a schematic view schematically illustrating an outline of an SPFS system as an aspect of an optical sample detection system of the present invention.
Figure 2:
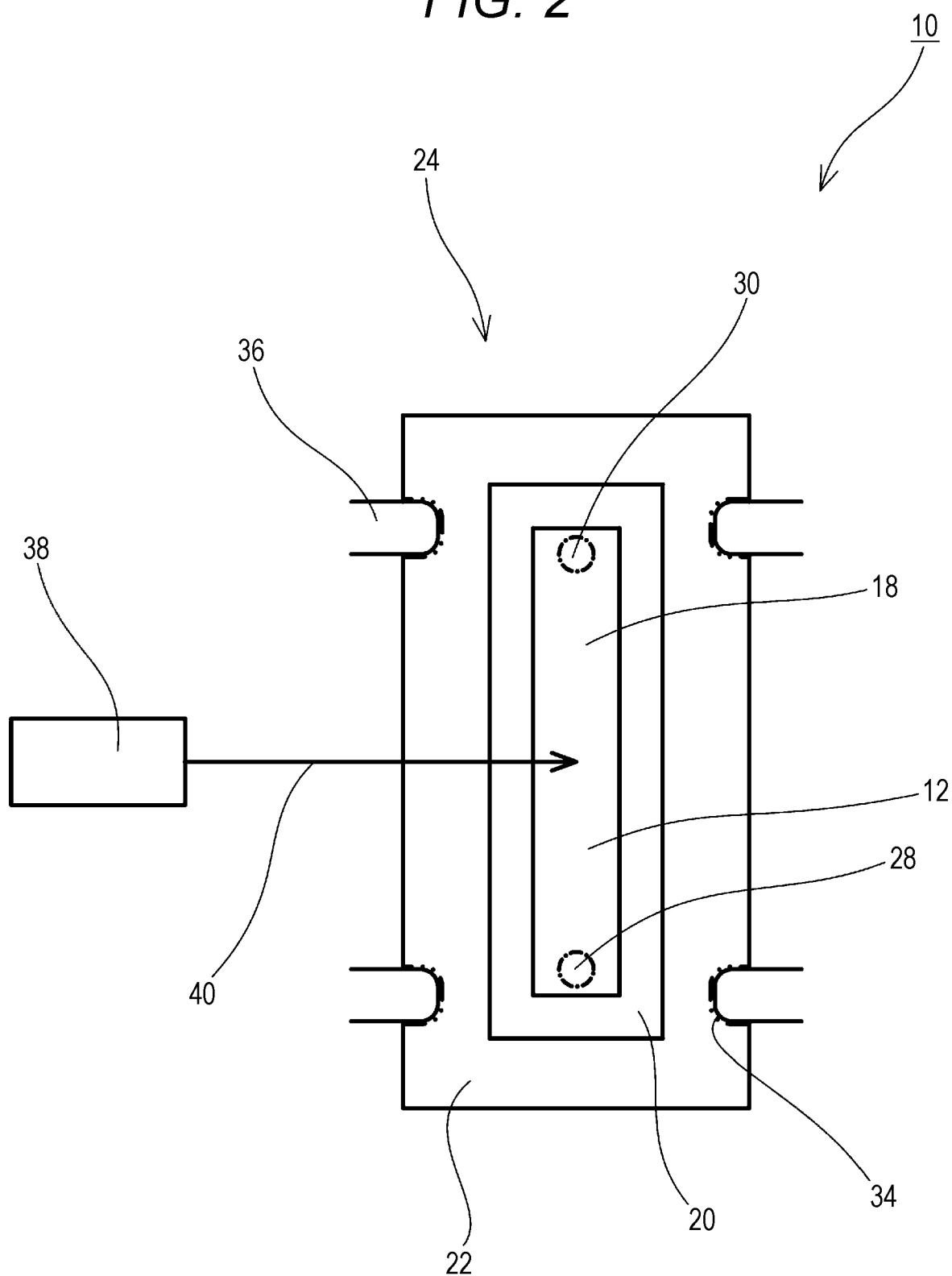
FIG. 2 is a schematic bottom view of a part of the SPFS system of FIG. 1 as seen from a bottom side.

FIG. 1 is a schematic view schematically illustrating an outline of an SPFS system as an aspect of an optical sample detection system of the present invention. FIG. 2 is a schematic view of a part of the SPFS system of FIG. 1 as seen from a bottom side.

Incidentally, here, directions of "upper" and "lower" are defined in the state of FIG. 1.

An SPFS system 10 according to this embodiment includes a sensor chip 24 including a prism-shaped dielectric member 12 having a substantially trapezoidal vertical cross section, a metal film 14 formed on a horizontal upper surface 12a of the dielectric member 12, a reaction layer 16 formed on an upper surface of the metal film 14, and a channel forming member 20 and a channel lid member 22 forming a channel 18 so as to surround the reaction layer 16. The sensor chip 24 is loaded in a chip loading portion 26 of an SPFS apparatus 11.

The reaction layer 16 of the sensor chip 24 has a solid phase film for thinning an analyte labeled with a fluorescent substance. By feeding a sample liquid containing the analyte to the channel 18, the analyte can be fixed onto the metal film 14.

The solid phase film is obtained by fixing a ligand for capturing an analyte, and can be constituted, for example, by a self-assembled monolayer (SAM) and a solid-phasing layer formed on the SAM.

Incidentally, the solid-phasing layer preferably includes a polymer constituted by at least one monomer selected from the group consisting of monomers included in glucose, carboxymethylated glucose, a vinyl ester, an acrylic acid ester, a methacrylic acid ester, an olefin, a styrene, a crotonic acid ester, an itaconic acid diester, a maleic acid diester, a fumaric acid diester, an allyl compound, a vinyl ether, and a vinyl ketone, and more preferably includes a hydrophilic polymer such as dextran or a dextran derivative and a hydrophobic polymer constituted by a hydrophobic monomer included in a vinyl ester, an acrylic acid ester, a methacrylic acid ester, an olefin, a styrene, a crotonic acid ester, an itaconic acid diester, a maleic acid diester, a fumaric acid diester, an allyl compound, a vinyl ether, and a vinyl ketone. Dextran such as carboxymethyl dextran (CMD) is particularly preferable from viewpoints of biocompatibility, an inhibitory property to a nonspecific adsorption reaction, and high hydrophilicity.

The dielectric member 12 is not particularly limited as long as being optically transparent at least with respect to the excitation light 40. However, in order to obtain a sensor chip which is inexpensive and excellent in a handling property, the dielectric member 12 is made of a resin material by injection molding.

Examples of the resin material forming the dielectric member 12 include a polyester such as polyethylene terephthalate (PET) or polyethylene naphthalate, a polyolefin such as polyethylene (PE) or polypropylene (PP), a polycyclic olefin such as a cyclic olefin copolymer (COC) or a cyclic olefin polymer (COP), a vinyl-based resin such as polyvinyl chloride or polyvinylidene chloride, polystyrene, polyetheretherketone (PEEK), polysulfone (PSF), polyethersulfone (PES), polycarbonate (PC), polyamide, polyimide, an acrylic resin, and triacetylcellulose (TAC).

In addition, the metal film 14 is not particularly limited, but is preferably made of at least one metal selected from the group consisting of gold, silver, aluminum, copper, and platinum, more preferably made of gold, and furthermore, may be made of an alloy of these metals.

That is, such a metal is suitable for the metal film 14 because of being stable to oxidation and increasing an electric field enhancement effect due to surface plasmon light (compressional wave) as described later.

In addition, a method for forming the metal film 14 is not particularly limited, and examples thereof include a sputtering method, a vapor deposition method (a resistance heating vapor deposition method, an electron beam vapor deposition method, or the like), an electrolytic plating method, and an electroless plating method. A sputtering method or a vapor deposition method is preferably used in view of easiness in adjustment of thin film forming conditions.

Furthermore, the thickness of the metal film 14 is not particularly limited, but is preferably within a range of 5 nm to 500 nm. Note that it is more preferable to use gold within a range of 20 nm to 70 nm, silver within a range of 20 nm to 70 nm, aluminum within a range of 10 to 50 nm, copper within a range of 20 to 70 nm, platinum within a range of 20 to 70 nm, and an alloy of these metals within a range of 10 to 70 nm from a viewpoint of the electric field enhancement effect.

The thickness of the metal film 14 within the above range is preferable because surface plasmon light (compressional wave) is easily generated. In addition, the shape of the metal film 14 is not particularly limited as long as the metal film 14 has such a thickness.

In addition, as the channel forming member 20, for example, an acrylic pressure-sensitive adhesive sheet or the like having a channel groove with a predetermined width and a predetermined length punched can be used. The thickness of such an acrylic pressure-sensitive adhesive sheet is not particularly limited, but is preferably about 0.1 mm.

In addition, the channel lid member 22 is not particularly limited as long as being a material having translucency with respect to the excitation light 40 and fluorescence 48, but a similar resin material to the above-described dielectric member 12 can be used.

Note that the channel lid member 22 includes a sample inflow port 28 and a sample discharge port 30 for feeding a sample liquid containing an analyte to the channel 18. By connecting the sample inflow port 28 and the sample discharge port 30 by a circulation feeding unit such as a pump, the sample liquid can be circulated and fed in one direction.

Figure 3:
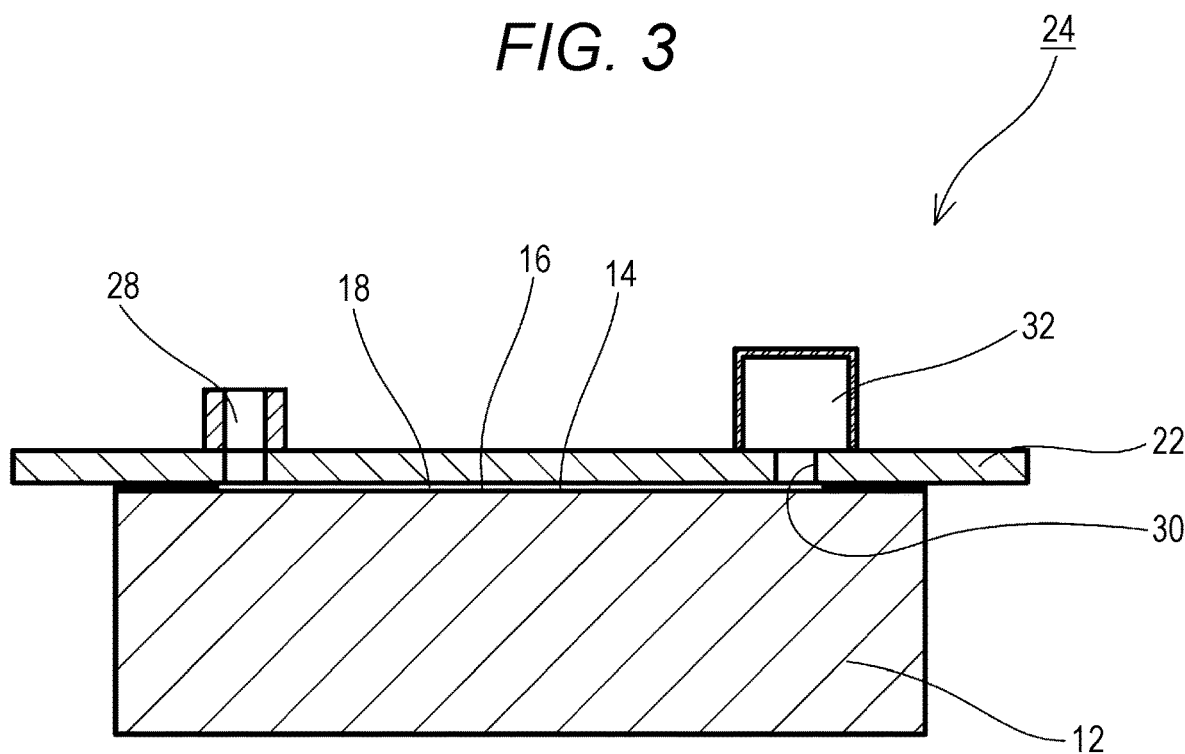
FIG. 3 is a schematic cross-sectional view illustrating an example of a sensor chip.

In addition, as illustrated in FIG. 3, by disposing a liquid reservoir 32 at the sample discharge port 30, injecting a sample liquid into the sample inflow port 28, for example, using a pipette, and repeating suction/injection of the sample liquid with the pipette, the sample liquid can be reciprocated in the pipette, the channel 18, and the liquid reservoir 32, and an analyte in the sample liquid is captured rapidly and efficiently by the ligand fixed to a solid phase film. Particularly, by reciprocating a sample liquid with respect to a solid phase film, even if the amount of the sample liquid is small, reaction efficiency between an analyte and the solid phase film is increased, and detection accuracy of the analyte can be improved.

Figure 4:
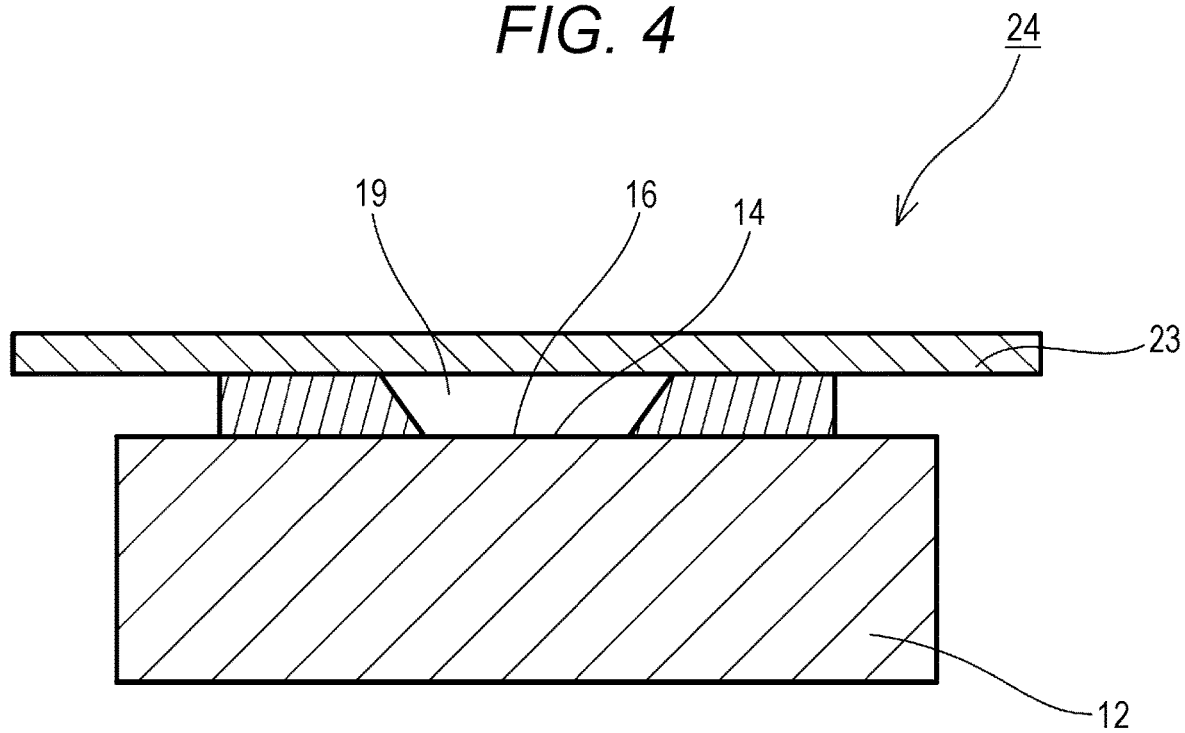
FIG. 4 is a schematic cross-sectional view illustrating another example of the sensor chip.

Incidentally, in the present embodiment, the reaction layer 16 is disposed in the channel 18, and a sample liquid is fed to the channel 18. However, for example, as illustrated in FIG. 4, the reaction layer 16 may be disposed in a well portion 19 such that the sample liquid stays in the well portion 19. In this case, as a lid member, a well lid member 23 is used in place of the channel lid member 22.

In addition, in the present embodiment, the width of the channel lid member 22 is designed so as to be larger than the width of the dielectric member 12 in the optical path cross section of the excitation light 40. With such a configuration, a holding region 34 can be provided in the channel lid member 22, and the sensor chip 24 can be loaded in the chip loading portion 26 such that the holding region 34 is in contact with the chip holding unit 36 of the chip loading portion 26.

By loading the sensor chip 24 in this manner, even in a case where the sensor chip 24 is exchanged, a positional relationship between the sensor chip 24 and a light projecting unit described later can be kept constant, and a measurement error can be reduced.

Incidentally, here, the "optical path cross section" means a cross section which coincides with a plane including an optical path of the excitation light 40 (including optical paths of metal film reflected light 40a and emission surface reflected light 40b described later) in a case where the excitation light 40 is emitted from a light projecting unit 38 toward the metal film 14.

As illustrated in FIG. 1, the light projecting unit 38 of the SPFS apparatus 11 for emitting the excitation light 40 is disposed on one side surface side below the sensor chip 24.

The light projecting unit 38 includes a light source including, for example, a laser diode (LD), a light emitting diode (LED), or a high intensity discharge (HID) lamp, and a collimating lens for converting light emitted from the light source into a parallel light flux.

Figure 5:
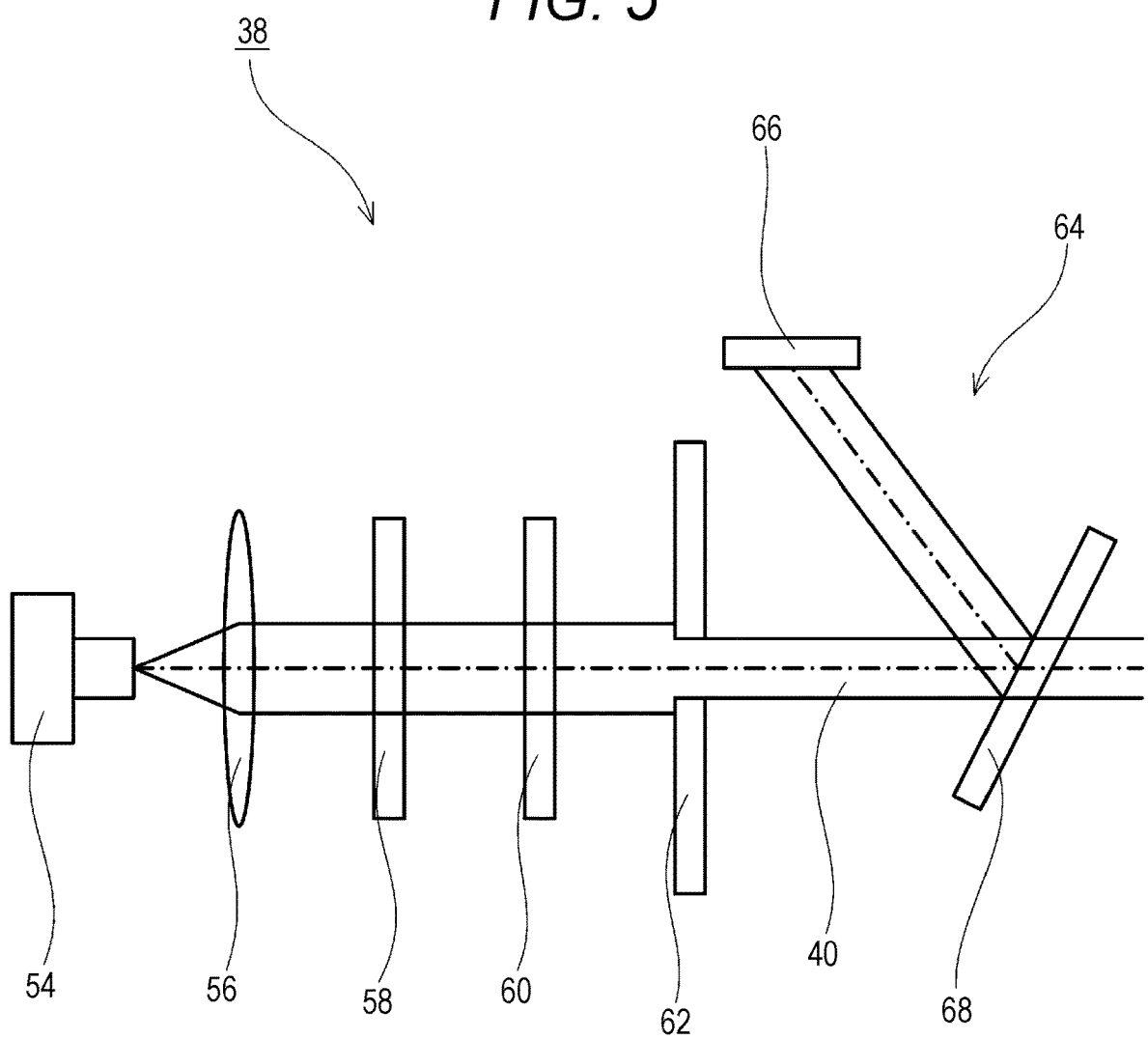
FIG. 5 is a schematic view illustrating an example of an optical configuration of a light projecting unit in the SPFS system according to the present embodiment.

FIG. 5 is a schematic view illustrating an example of an optical configuration of the light projecting unit 38 in the SPFS system 10 according to the present embodiment.

As illustrated in FIG. 5, an optical system of the light projecting unit 38 includes a laser diode (LD) 54 as a light source, a collimating lens 56 for collimating light emitted from the LD 54, a polarizing plate 58 for converting the excitation light 40 emitted to the metal film 14 of the sensor chip 24 into P-polarized light, a short pass filter 60 for cutting light with a certain wavelength for preventing scattered light or stray light of the LD 54 from being detected by a light receiving unit 50, and an aperture 62 for regulating an irradiation spot size onto the metal film 14.

The excitation light 40 emitted from such light projecting unit 38 is substantially parallel light. Note that an emission wavelength of the LD 54 includes at least a wavelength for generating surface plasmon on the metal film 14.

Here, even if a constant current flows through the LD 54, the amount of light emitted from the LD 54 varies depending on a temperature of a measurement environment or the like. Therefore, in an optical sample detection system that needs to measure the absolute light amount as the light amount correlated with the amount of a sample to be tested, accurate measurement cannot be performed.

Therefore, in the SPFS system 10 according to the present embodiment, an auto power control (APC) optical system 64 is disposed in the light projecting unit 38 in order to keep the light amount emitted from the light projecting unit 38 constant. Specifically, the APC optical system 64 includes an APC photodiode 66 and a beam splitter 68 for causing a part of the excitation light 40 emitted from the aperture 62 to be reflected by the APC photodiode 66 and emitting remaining light to the metal film 14.

By detecting the light amount of the light reflected by the beam splitter 68 in the APC photodiode 66 and applying feedback to an input current value of the LD 54 according to the detected light amount, a control unit (not illustrated) performs control such that the light amount detected by the APC photodiode 66 is constant, that is, the light amount emitted from the light projecting unit 38 is constant.

Furthermore, the beam splitter 68 is desirably made of, for example, a high refractive index material having a refractive index of 1.6 or more. An incidence angle of the excitation light 40 on the beam splitter 68 is desirably smaller, and is desirably 40° or less, for example.

With such a configuration, an optical element such as the LD 54 or the collimating lens 56 in the light projecting unit 38 is eccentric due to a change in environment or time. As a result, even if the incidence angle of the excitation light 40 on the beam splitter 68 changes, the amount of variation in a reflection/transmission branching ratio of the beam splitter 68 can be suppressed to a low value. Therefore, the light amount emitted from the light projecting unit 38 can be stabilized.

The light projecting unit 38 includes an irradiation angle varying mechanism (not illustrated) such that the incidence angle of the excitation light 40 on the metal film 14 can be changed within a range of a predetermined measurement scanning angle.

Here, the measurement scanning angle means an emission angle of the emitted excitation light 40 obtained by scanning the light projecting unit 38 (zero reference of the angle is a line perpendicular to the plane of the metal film 14) while the light projecting unit 38 emits the excitation light 40 and the light receiving unit 50 measures the fluorescence 48 or scattered light such as plasmon scattered light, or both the fluorescence 48 and the scattered light.

Here, the plasmon scattered light is light in which surface plasmon itself generated on the metal film 14 is scattered, and the wavelength thereof is equal to the wavelength of the excitation light 40. Incidentally, in a case where scanning is performed for the emission angle of the excitation light 40, an angle at which the light amount of plasmon scattered light is maximized is an enhancement angle, and intense fluorescence intensity by surface plasmon is obtained at an angle near this enhancement angle.

The enhancement angle depends on the shape and refractive index of the dielectric member 12 in the sensor chip 24, the material and film thickness of the metal film 14, the refractive index of a fluid in the channel 18, and the like. Therefore, considering an error in manufacturing the sensor chip 24, an optimum enhancement angle is desirably obtained for each measurement.

The excitation light 40 is emitted from the light projecting unit 38 toward the incidence surface 12b of the dielectric member 12 and is incident on the metal film 14 adjacent to an upper surface of the dielectric member 12. As a result, the fluorescence 48 emitted by a fluorescent substance excited by surface plasmon light (compressional wave) generated on the metal film 14 is detected by the light receiving unit 50 disposed above the sensor chip 24.

For example, an optical system of the light receiving unit 50 includes a photodiode which is a light receiving element for receiving scattered light (plasmon scattered light) generated by surface plasmon or the fluorescence 48, a lens for concentrating light on the photodiode, and an excitation light cut filter for cutting light having a wavelength of the excitation light 40.

In a case where the fluorescence 48 is measured, the excitation light cut filter is disposed on an optical path in the light receiving unit 50. In a case where plasmon scattered light is measured, at least a part of the excitation light cut filter is retracted from the optical path in the light receiving unit 50, for example, using an excitation light cut filter driving mechanism such that the plasmon scattered light can be incident on a photodiode.

The excitation light cut filter is, for example, a band pass filter made of a dielectric multilayer film, and is disposed at a position where the fluorescence 48 is a substantially parallel light flux in the optical path in the light receiving unit 50.

In addition, the light receiving element is not limited to a photodiode as long as being able to measure the light amount of received light, such as a photomultiplier tube or an avalanche photodiode (APD).

Meanwhile, in the excitation light 40, light (metal film reflected light 40a) reflected by the metal film 14 is emitted from an emission surface 12c of the dielectric member 12.

In addition, as illustrated in FIG. 1, a part of the metal film reflected light 40a is reflected by the emission surface 12c. Although depending on an incidence angle of the excitation light 40 on the metal film 14, the emission surface reflected light 40b travels straight toward the incidence surface 12b, and is emitted from the incidence surface 12b to an outside of the dielectric member 12.

In the SPFS system 10 according to the present embodiment, the emission surface reflected light 40b is not incident on the channel lid member 22 within a measurement scanning angle.

Specifically, with the following configuration, it is possible to prevent the emission surface reflected light 40b from being incident on the channel lid member 22 within the measurement scanning angle.

An example of a flow of measurement in the SPFS system 10 according to the present embodiment will be described below.

Figure 6:
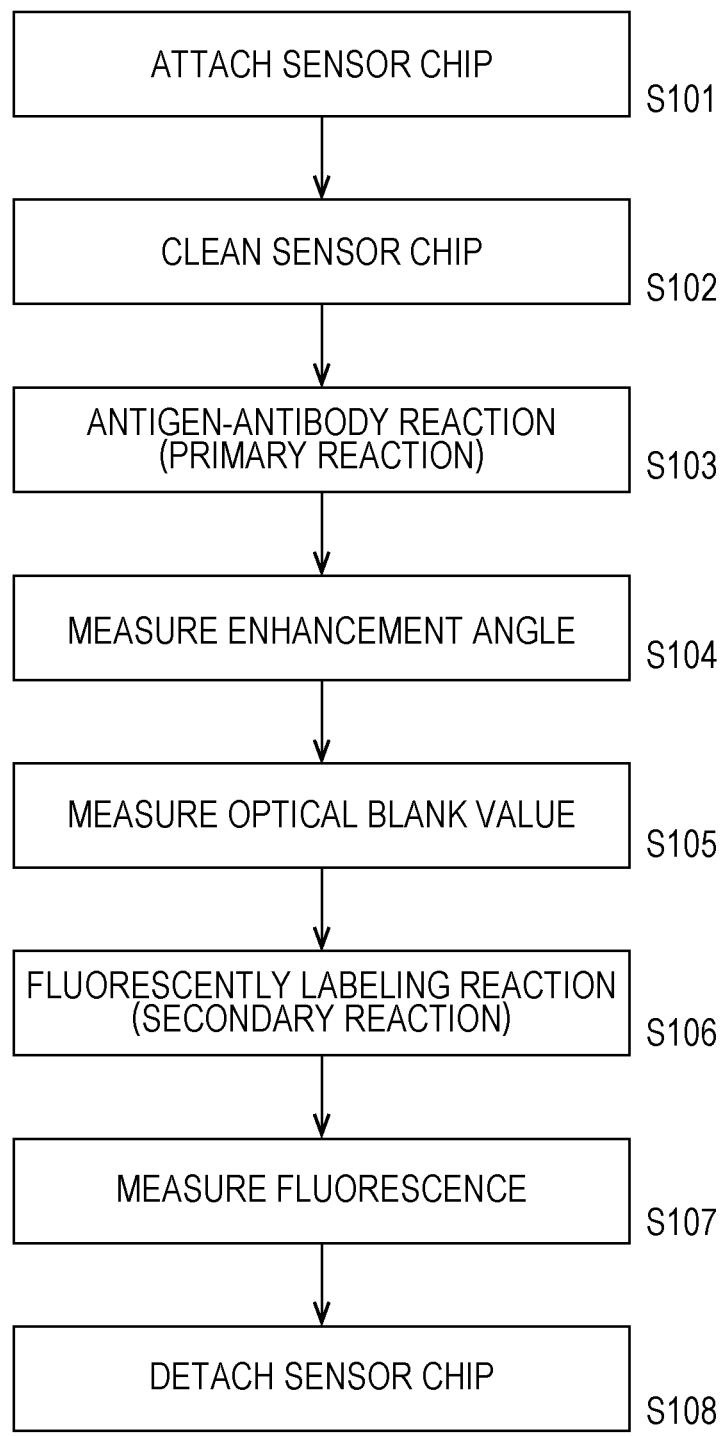
FIG. 6 is a flow chart for explaining a flow of measurement in the SPFS system according to the present embodiment.

FIG. 6 is a flow chart for explaining a flow of measurement in the SPFS system according to the present embodiment.

(S101) The sensor chip 24 is prepared and attached to the chip loading portion 26 of the SPFS system 10. The sensor chip 24 is exchanged and disposable for each sample in a biochemical test. In general, blood or the like is used as a sample.

(S102) Subsequently, an inside of the channel 18 of the sensor chip 24 is cleaned. A moisturizing agent is applied in the channel 18 of the sensor chip 24 in order to keep sensitivity of capturing an analyte in a solid phase film. By introducing a cleaning liquid into the channel 18, the moisturizing agent is cleaned. In addition, contaminants around the solid phase film are also removed by cleaning.

(S103) Subsequently, a sample liquid mixed with the analyte is introduced into the channel 18, and the analyte is captured by the solid phase film in the channel 18 by an antigen-antibody reaction (primary reaction). After capturing, the excessive sample liquid is sucked from an inside of the channel 18 to be removed. In addition, residues in the channel 18 are removed with an appropriate cleaning liquid, if necessary.

(S104) Subsequently, an enhancement angle is measured. In measurement of an enhancement angle, scanning is performed for an emission angle of the excitation light 40 emitted from the light projecting unit 38, plasmon scattered light is detected by the light receiving unit 50, and the enhancement angle is obtained. At this time, an excitation light cut filter used in measurement of fluorescence described later is retracted from an optical path in the light receiving unit 50. As a result, the plasmon scattered light having the same wavelength as the excitation light 40 can reach the light receiving element in the light receiving unit 50, and the light amount of the plasmon scattered light can be measured by the light receiving unit 50.

(S105) Subsequently, an excitation light cut filter is disposed in the optical path in the light receiving unit 50, the light projecting unit 38 emits the excitation light 40, the light amount detected by the light receiving unit 50 is measured, and this light amount is recorded as an optical blank value (oB). At this time, the angle of the light projecting unit 38 is set such that the emission angle of the excitation light 40 is the enhancement angle obtained by the measurement of the enhancement angle.

(S106) Subsequently, a fluorescently labeling liquid is introduced into the channel 18, and a fluorescently labeling antibody contained in the fluorescently labeling liquid is brought into contact with and binding to an analyte to perform a fluorescently labeling reaction (secondary reaction). As a result, the analyte is fluorescently labeled. Thereafter, an inside of the channel 18 is cleaned in order to remove the excessive fluorescently labeling antibody.

(S107) Subsequently, the angle of the light projecting unit 38 is set such that the emission angle of the excitation light 40 is an enhancement angle. The excitation light 40 is emitted while an excitation light cut filter is disposed on an optical path in the light receiving unit 50, and a fluorescence signal value (S) detected by the light receiving unit 50 is measured.

Furthermore, a value obtained by subtracting the optical blank value (oB) obtained in the measurement of the optical blank value (S105) from the fluorescence signal value (S) is calculated. As a result, a fluorescence intensity (ΔS) correlated with the amount of analyte is obtained.

(S108) Finally, the sensor chip 24 is detached from the SPFS system 10, and the measurement is completed.

In the above process, a measurer may manually perform work such as movement of the sensor chip 24, the excitation light cut filter, or the like, or introduction, suction, cleaning, or the like of a sample liquid into the channel 18, or the SPFS system 10 may include a driving mechanism or a control mechanism for automatically performing the work. In addition, the SPFS system 10 may include a recording unit that records measurement results or an output unit that outputs results.

FIG. 7 is a schematic view illustrating an example of the shape of a dielectric member in the SPFS system according to the present embodiment.

In the embodiment illustrated in FIG. 1, in the dielectric member 12, the incidence surface 12b and the emission surface 12c are each a smooth surface, and an angle $\theta_a$ formed by the upper surface 12a adjacent to the metal film 14 of the dielectric member 12 and the incidence surface 12b is the same as an angle $\theta_b$ formed by the upper surface 12a adjacent to the metal film 14 of the dielectric member 12 and the emission surface 12c. However, in the embodiment illustrated in FIG. 7, $\theta_a$ is different from $\theta_b$.

Figure 7A:
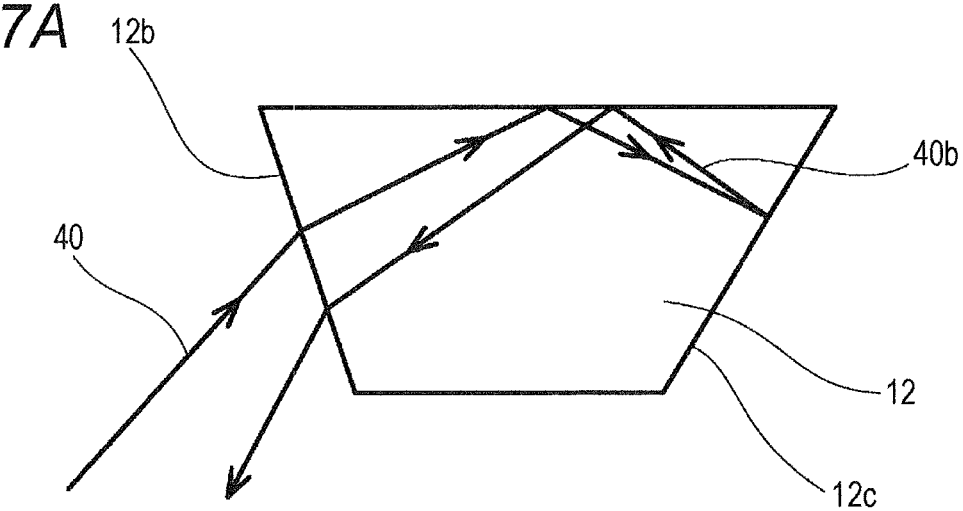
FIG. 7 is a schematic view illustrating an example of the shape of a dielectric member in the SPFS system according to the present embodiment.

In the example of FIG. 7A, $\theta_a$ is smaller than $\theta_b$. In this case, the metal film reflected light 40a is reflected by the emission surface 12c, then is reflected by the upper surface 12a, and is emitted from the incidence surface 12b. The emission surface reflected light 40b reflected by the upper surface 12a does not travel toward a side of the channel lid member 22 in this manner. Therefore, it is possible to prevent the emission surface reflected light 40b from being incident on the channel lid member 22 within a measurement scanning angle.

Figure 7B:
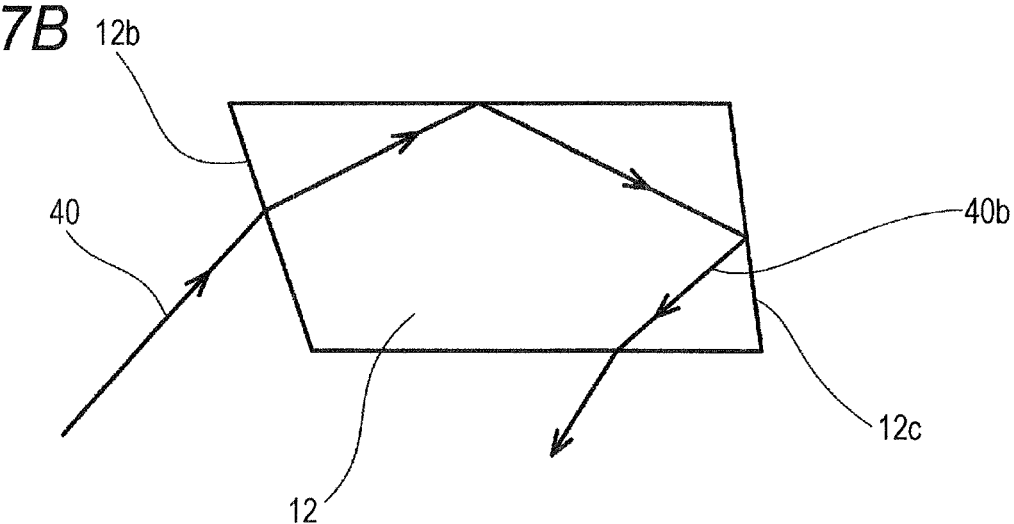

In the example of FIG. 7B, $\theta_a$ is larger than $\theta_b$ and is an obtuse angle. In this case, the metal film reflected light 40a is reflected by the emission surface 12c and then emitted from a bottom surface 12d. By emitting the emission surface reflected light 40b from the bottom surface 12d of the dielectric member 12 in this manner, it is possible to prevent the emission surface reflected light 40b from being incident on the channel lid member 22.

Figure 7C:
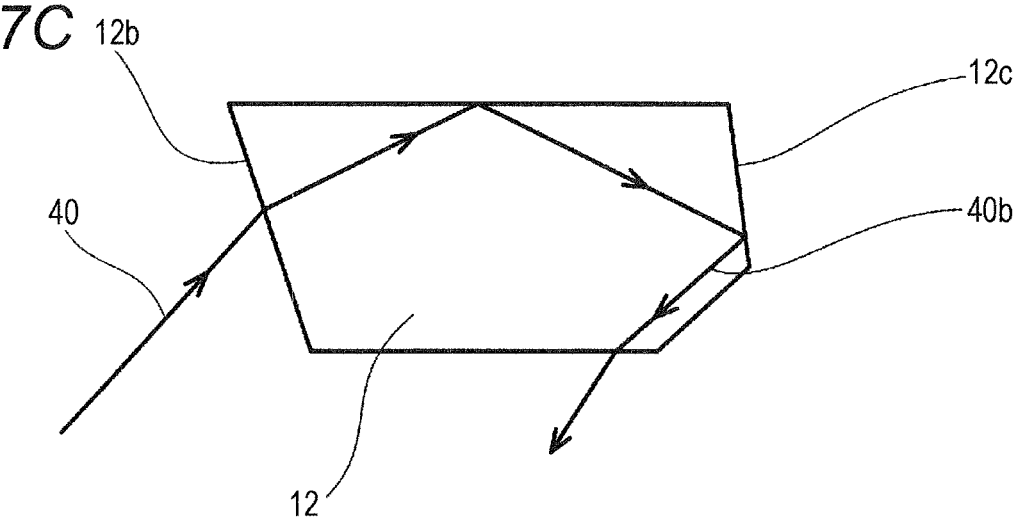

Incidentally, as illustrated in FIG. 7C, the emission surface 12c may be constituted by a plurality of surfaces. In this case, it is possible to prevent the emission surface reflected light 40b from being incident on the channel lid member 22 as long as $\theta_a$ is larger than $\theta_b$ similarly to FIG. 7B.

By setting $\theta_a$ to an angle larger than $\theta_b$ in this manner, as illustrated in FIG. 6, the emission surface reflected light 40b travelling toward the incidence surface 12b is closer to the bottom surface 12d. Therefore, it is easier to constitute the sensor chip 24.

Figure 8A:
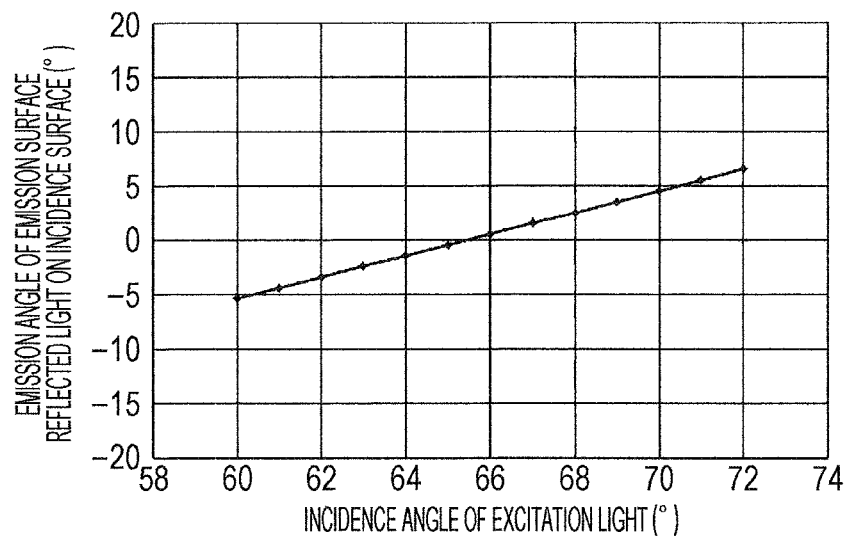
FIG. 8 is a graph illustrating a relationship between an incidence angle of excitation light and an emission angle of emission surface reflected light.
Figure 8B:
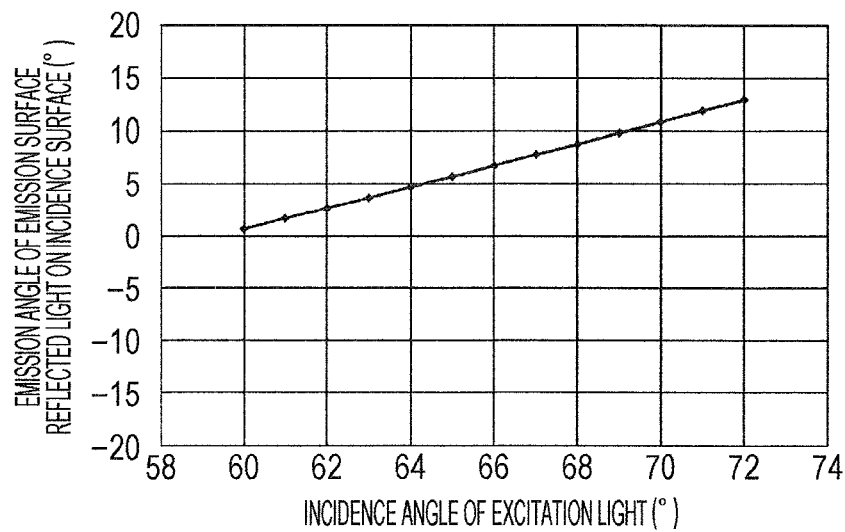
Figure 8C:
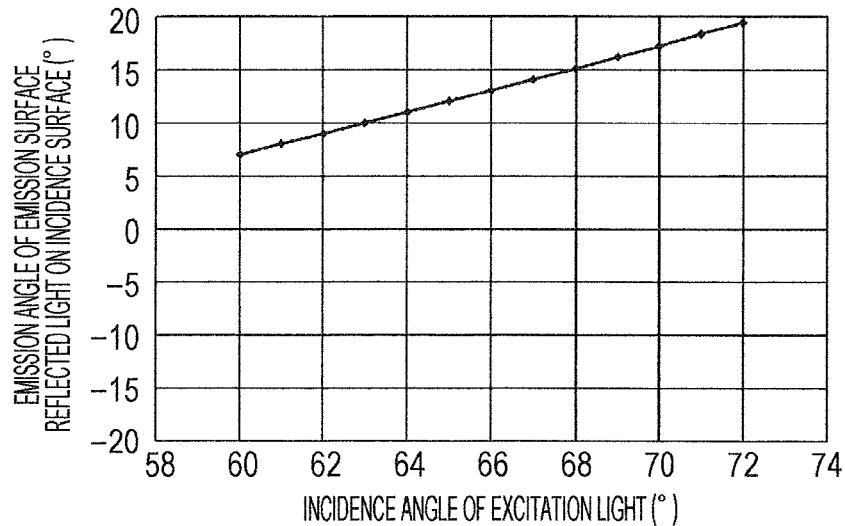

Incidentally, FIGS. 8A, 8B, and 8C illustrate a relationship between an incidence angle of the excitation light 40 and an emission angle $\theta_c$ of the emission surface reflected light 40b on the incidence surface 12b in a case of $\theta_a=80°$ and $\theta_b=82°$, a case of $\theta_a=80°$ and $\theta_b=80°$, and a case of $\theta_a=80°$ and $\theta_b=78°$, respectively.

Incidentally, depending on the incidence angle of the emission surface reflected light 40b on the bottom surface 12d, a part of light may travel toward the incidence surface 12b to be incident on the channel lid member 22. Therefore, it is preferable to prevent the emission surface reflected light 40b from travelling from the bottom surface 12d of the dielectric member 12 toward the incidence surface 12b by making the bottom surface 12d a scattering surface or a non-flat surface.

In addition, by forming the dielectric member 12 so as to satisfy the following formula (1) in at least a part within a measurement scanning angle of the excitation light 40, the emission surface reflected light 40b on the incidence surface 12b is emitted to a bottom surface side rather than in a horizontal direction, and the emission surface reflected light 40b can be prevented from being incident on the channel lid member 22.

[Mathematical Formula 1]

$$\frac{n_1}{n_0} \cdot \frac{\sin(\theta_a + 2\theta_b - \theta)}{\cos \theta_a} \le \cos \theta_a \quad (1)$$

Here, $n_1$ represents the refractive index of the dielectric member 12, $n_0$ represents the refractive index of the dielectric member 12 on an excitation light incident side of the incidence surface 12b, and $\theta$ represents the incidence angle of the excitation light 40 on the metal film 14.

Incidentally, in the incidence surface 12b of the dielectric member 12, a part of the excitation light 40 is reflected by the incidence surface 12b when the excitation light 40 is incident thereon. When such incidence surface reflected light 40c is incident on the channel lid member 22, a similar problem to the above-described emission surface reflected light 40b arises. Therefore, it is preferable to prevent the incidence surface reflected light 40c from being incident on the channel lid member 22.

In addition, the emission angle $\theta_c$ of the emission surface reflected light 40b on the incidence surface 12b preferably coincides with a reflection angle $\theta_d$ of the incidence surface reflected light 40c on the incidence surface 12b within the measurement scanning angle of the excitation light 40.

With such a configuration, as illustrated in FIGS. 9 and 10, the range of the emission angle $\theta_c$ of the emission surface reflected light 40b overlaps with the range of the reflection angle $\theta_d$ of the incidence surface reflected light 40c within the measurement scanning angle of the excitation light 40. Therefore, a light existence range through which the emission surface reflected light 40b and the incidence surface reflected light 40c pass is narrowed, and the sensor chip 24 is easily configured such that the emission surface reflected light 40b and the incidence surface reflected light 40c are not incident on the channel lid member 22.

Figure 9A:
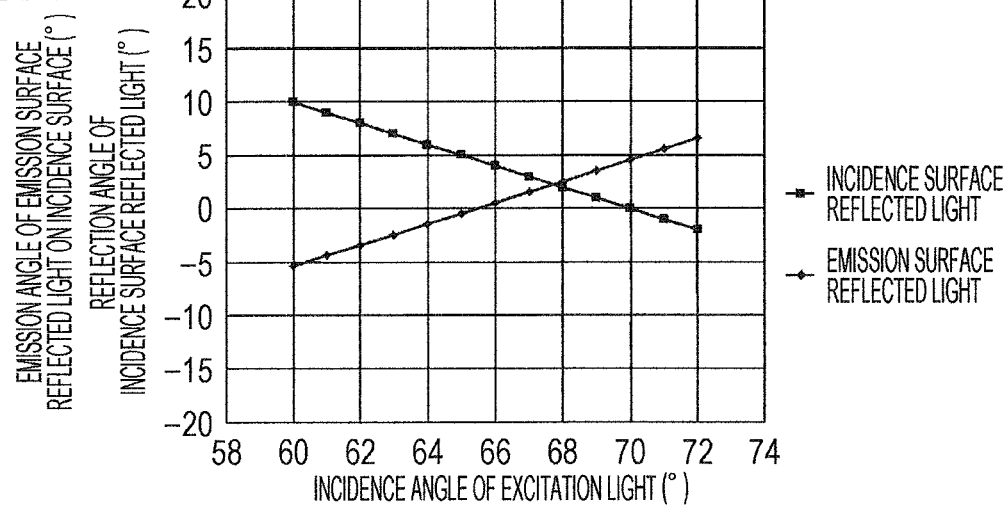
FIG. 9 is a graph illustrating a relationship between an incidence angle of excitation light and each of an emission angle on an incidence surface of emission surface reflected light and a reflection angle of incidence surface reflected light in a case where a measurement scanning angle of the excitation light is set to 60° to 72°.
Figure 9B:
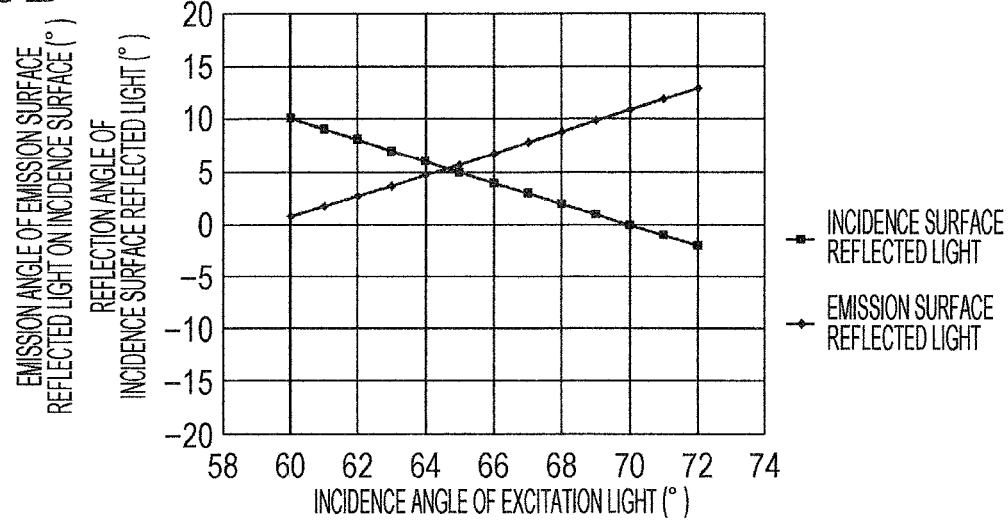
Figure 9C:
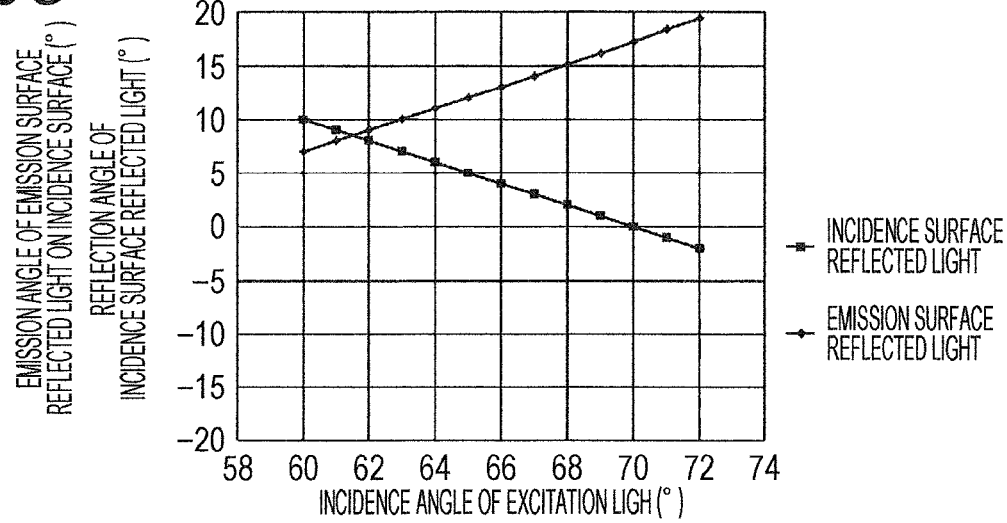

Incidentally, FIG. 9 illustrates a relationship between an incidence angle of the excitation light 40 and each of the emission angle $\theta_c$ of the emission surface reflected light 40b on an incidence surface and the reflection angle $\theta_d$ of the incidence surface reflected light 40c in a case where the measurement scanning angle of the excitation light 40 is set to 60° to 72°. FIGS. 9A, 9B, and 9C illustrate a case of $\theta_a=80°$ and $\theta_b=82°$, a case of $\theta_a=80°$ and $\theta_b=80°$, and a case of $\theta_a=80°$ and $\theta_b=78°$, respectively.

Figure 10A:
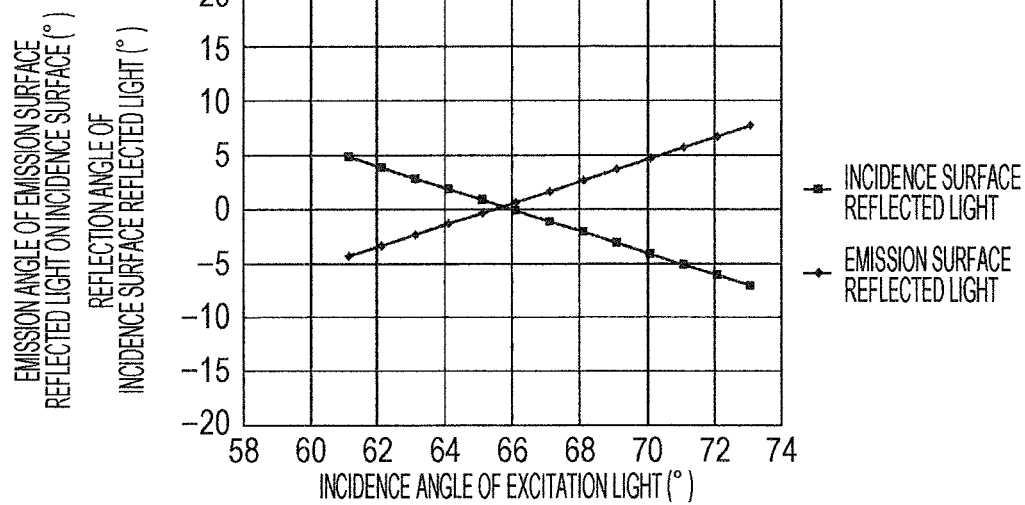
FIG. 10 is a graph illustrating a relationship between an incidence angle of excitation light and each of an emission angle on an incidence surface of emission surface reflected light and a reflection angle of incidence surface reflected light in a case where a measurement scanning angle of the excitation light is set to 61° to 73°.
Figure 10B:
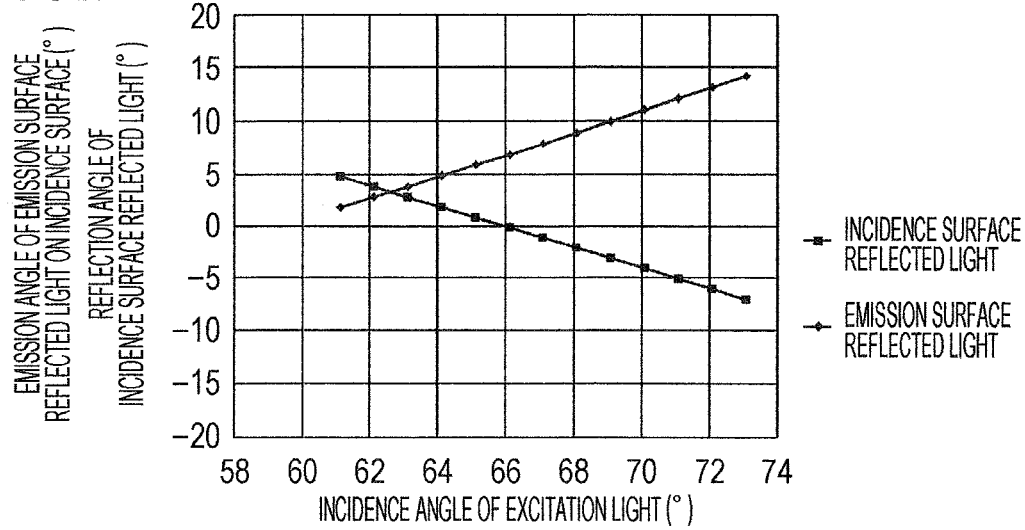
Figure 10C:
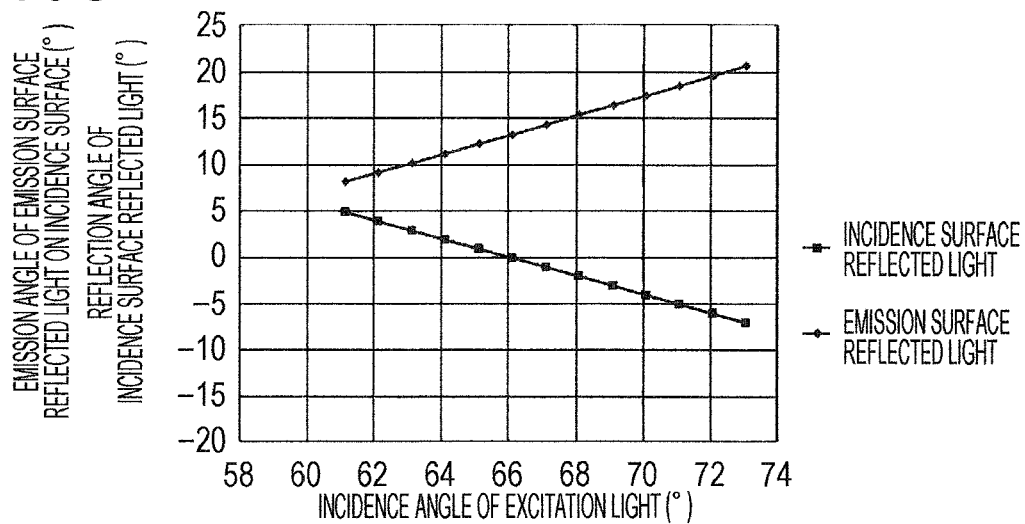

In addition, FIG. 10 illustrates a relationship between an incidence angle of the excitation light 40 and each of the emission angle $\Theta_c$ of the emission surface reflected light 40b on an incidence surface and the reflection angle $\theta_d$ of the incidence surface reflected light 40c in a case where the measurement scanning angle of the excitation light 40 is set to 61° to 73°. FIGS. 10A, 10B, and 10C illustrate a case of $\theta_a=80°$ and $\theta_b=82°$, a case of $\theta_a=80°$ and $\theta_b=80°$, and a case of $\theta_a=80°$ and $\theta_b=78°$, respectively.

Figure 11:
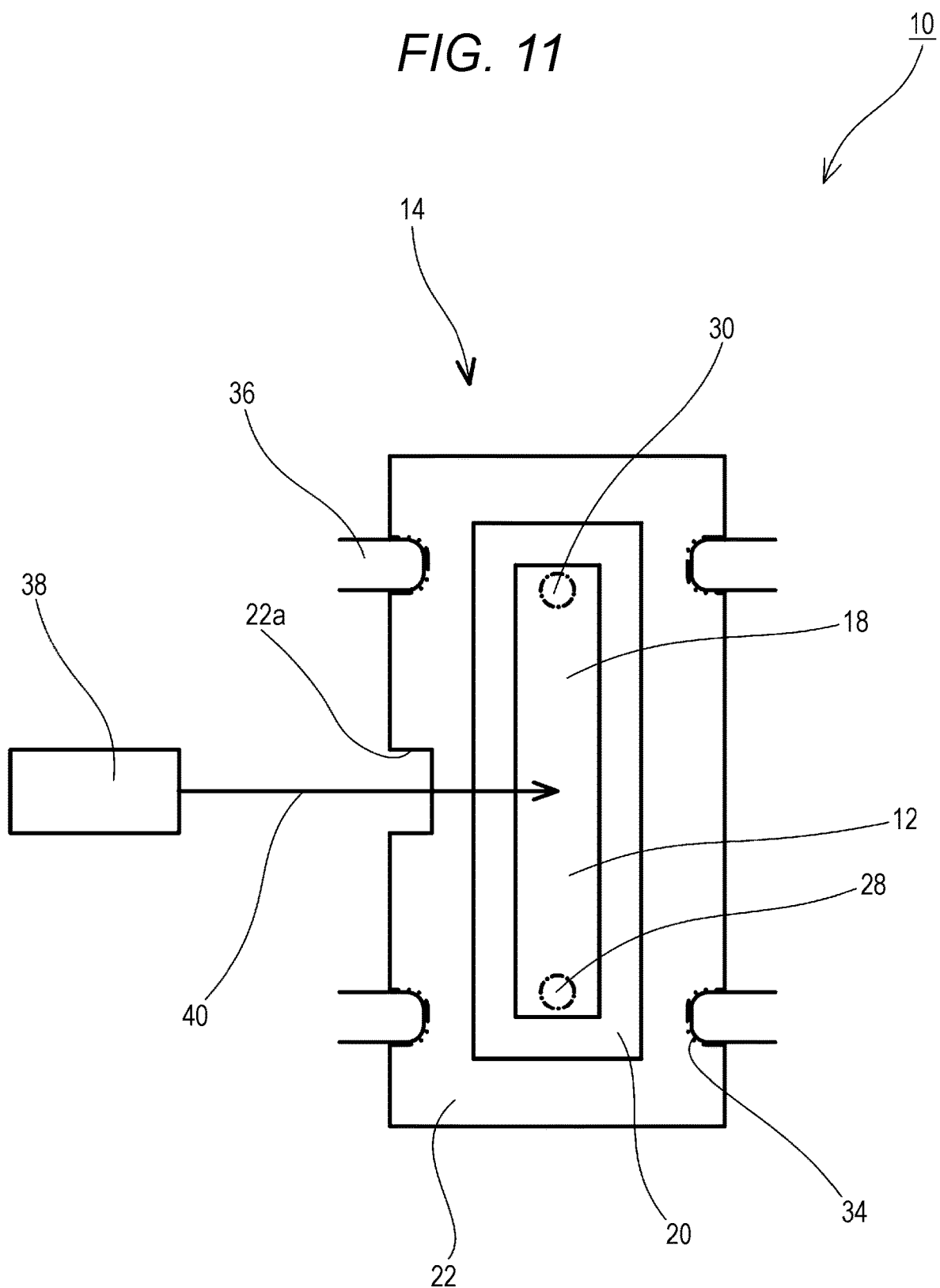
FIG. 11 is a schematic bottom view illustrating still another example of the sensor chip.

In addition, as illustrated in FIG. 11, a cut-out portion 22a can be formed in a part of the channel lid member 22 in an optical path cross section of the excitation light 40.

By forming the cut-out portion 22a in this manner, the holding region 34 can be provided in the channel lid member 22, and the emission surface reflected light 40b is not incident on the channel lid member 22.

Incidentally, the emission surface reflected light 40b emitted from the dielectric member 12 may be reflected, for example, by a wall surface of the SPFS system 10, causing stray light. Therefore, as illustrated in FIG. 1, it is preferable to dispose a light shielding member 52 for absorbing the emission surface reflected light 40b emitted from the incidence surface 12b of the dielectric member 12 or for reflecting the emission surface reflected light 40b in a direction having no influence.

Figure 12:
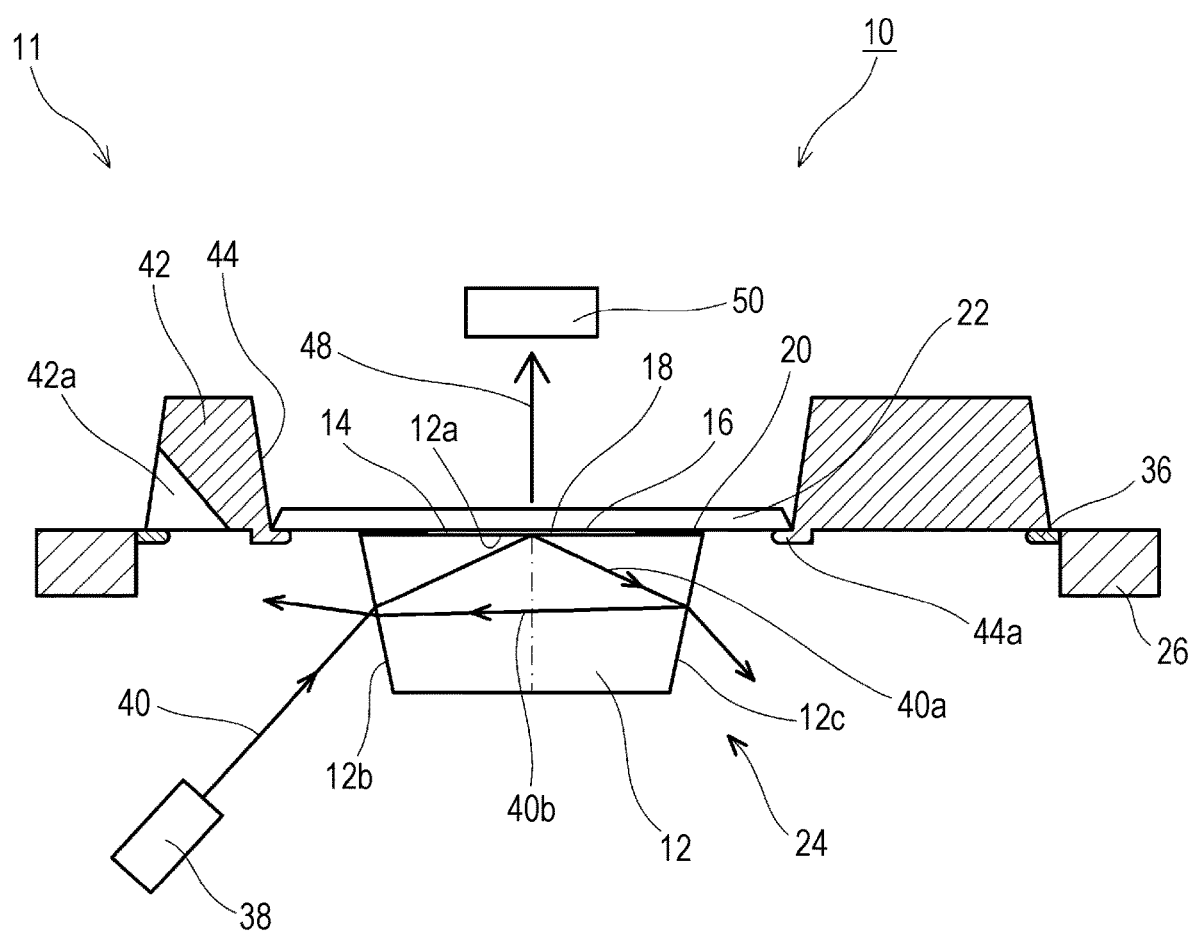
FIG. 12 is a schematic view schematically illustrating another example of the SPFS system as an aspect of the optical sample detection system of the present invention.
Figure 13:
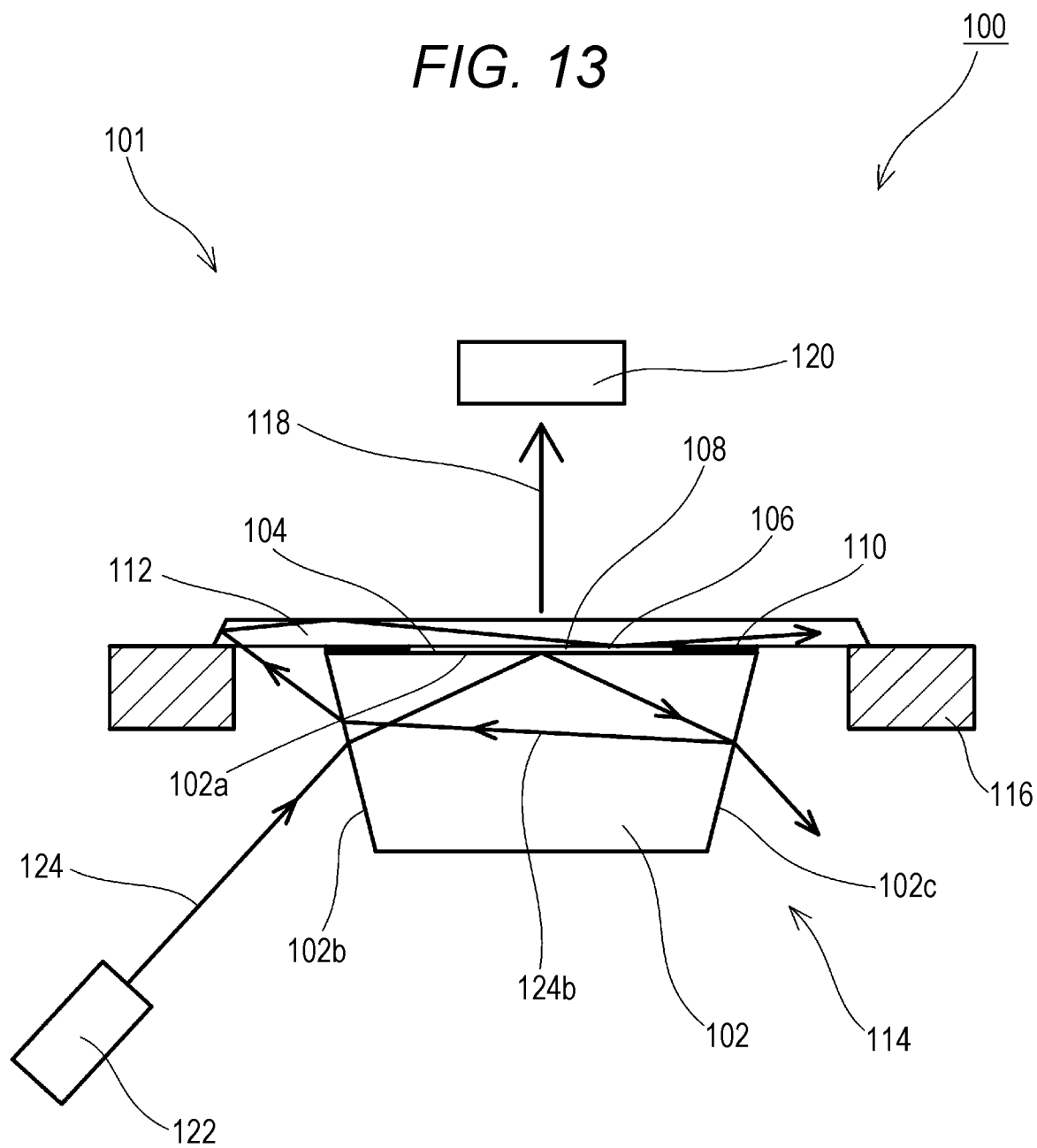
FIG. 13 is a schematic view for explaining the configuration of a conventional SPFS system.
Figure 14:
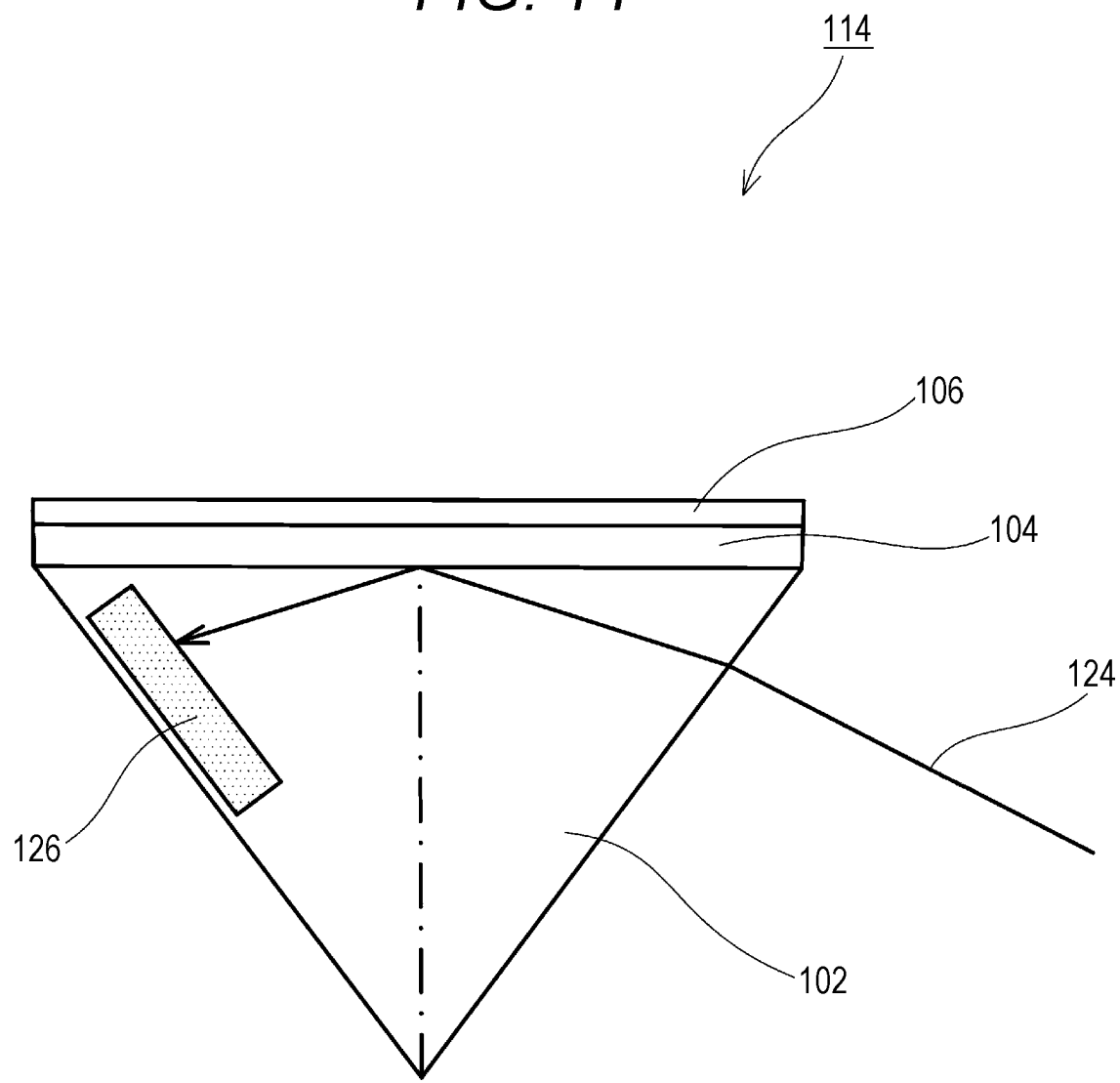
FIG. 14 is a schematic view for explaining the configuration of a sensor chip disclosed in Patent Literature 1.
Figure 15:
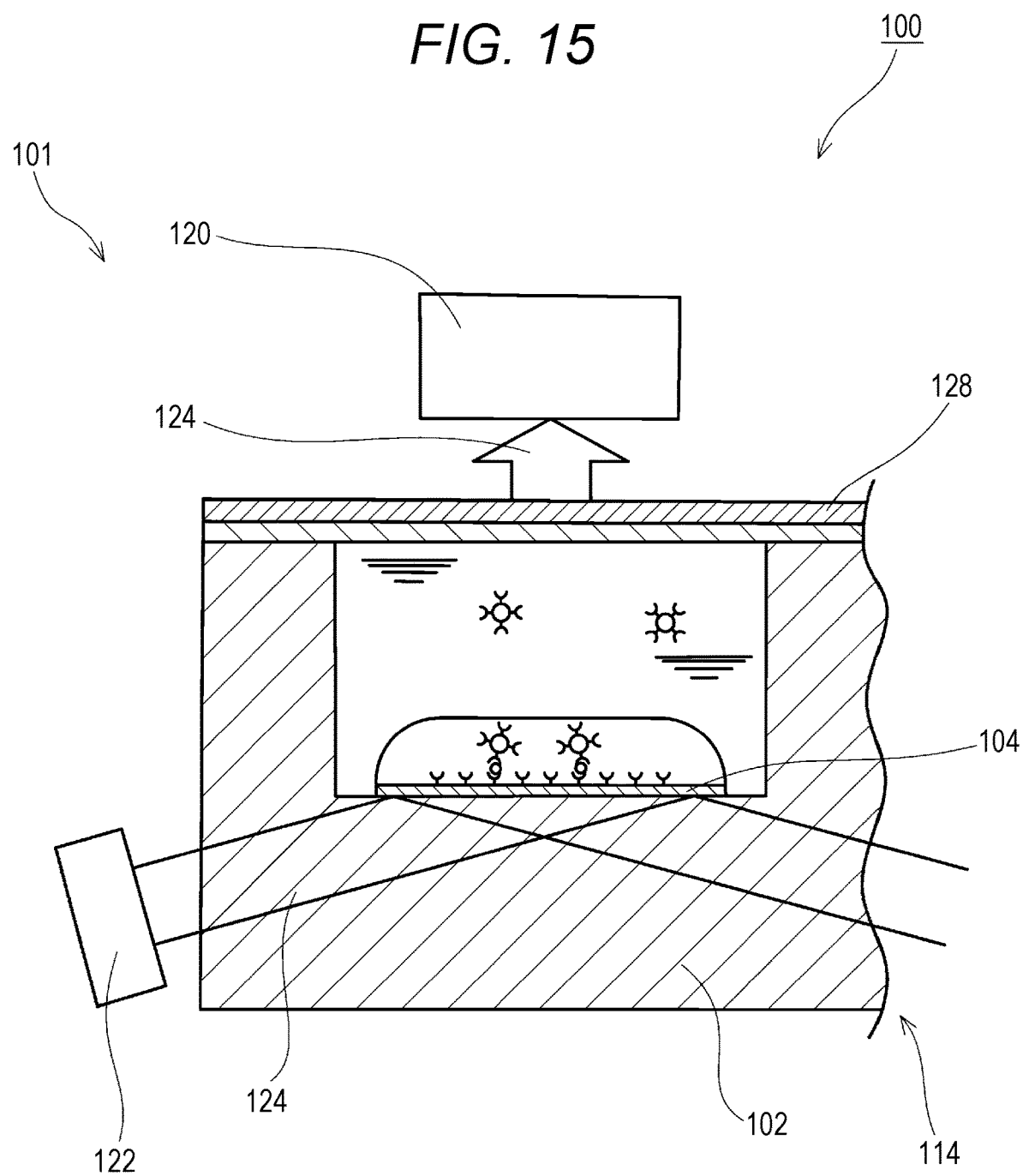
FIG. 15 is a schematic view for explaining the configuration of an SPFS system disclosed in Patent Literature 2.

FIG. 12 is a schematic view schematically illustrating another example of the SPFS system according to an aspect of the optical sample detection system of the present invention.

Basically, the SPFS system 10 according to this embodiment has a similar configuration to the SPFS system 10 illustrated in FIG. 1. Therefore, the same constituent members are denoted by the same reference numerals, and a detailed description thereof will be omitted.

In the present embodiment, the sensor chip 24 includes a reagent well 42 made of a material having translucency with respect to the excitation light 40.

The reagent well 42 is, for example, a container for storing a sample liquid or a chemical liquid. The sensor chip 24 is loaded in a sensor chip loading hole 44 formed in the reagent well 42.

At this time, by loading the sensor chip 24 in the sensor chip loading hole 44 such that the holding region 34 of the channel lid member 22 is in contact with the holding portion 44a of the sensor chip loading hole 44, a positional relationship between the sensor chip 24 and the reagent well 42 can be kept constant.

Furthermore, by loading the sensor chip 24 in the chip loading portion 26 such that a holding region 46 of the reagent well 42 is in contact with the chip holding unit 36 of the chip loading portion 26, a positional relation between the sensor chip 24 and the light projecting unit 38 can be kept constant to reduce a measurement error.

In a case where the reagent well 42 made of a material having translucency with respect to the excitation light 40 is included in this manner, a configuration that the emission surface reflected light 40b is not incident on the channel lid member 22 and furthermore is not incident on the reagent well 42 in the measurement scanning angle of the excitation light 40 is preferable.

Specifically, as described above, it is possible to deal therewith by designing the shape of the dielectric member 12 such as the angle $\theta_a$ or $\theta_b$ such that the emission surface reflected light 40b is not incident on the reagent well 42.

In addition, as illustrated in FIG. 12, a cut-out portion 42a may be formed in a part of the reagent well 42 in an optical path cross section of the excitation light 40.

By forming the cut-out portion 42a in this manner, the holding region 46 can be provided in the reagent well 42, and the emission surface reflected light 40b is not incident on the reagent well 42.

The preferable embodiment of the present invention has been described above. However, the present invention is not limited thereto. For example, in the above embodiment, an SPFS system has been exemplified as an aspect of an optical sample detection system. However, various modifications are possible without departing from an object of the present invention, for example, the present invention is applicable to an SPR system as another aspect.

INDUSTRIAL APPLICABILITY

The present invention can perform sample detection rapidly with high accuracy in a field requiring highly accurate detection such as a clinical test such as a blood test, for example, using surface plasmon-field enhanced fluorescence spectroscopy (SPFS).

REFERENCE SIGNS LIST

10 SPFS system
11 SPFS apparatus
12 Dielectric member
12a Upper surface
12b Incidence surface
12c Emission surface
12d Bottom surface
14 Metal film
16 Reaction layer
18 Channel
20 Channel forming member
22 Channel lid member
22a Cut-out portion
24 Sensor chip
26 Chip loading portion
28 Sample inflow port
30 Sample discharge port
32 Liquid reservoir
34 Holding region
36 Chip holding unit
38 Light projecting unit
40 Excitation light
40a Metal film reflected light
40b Emission surface reflected light
40c Incidence surface reflected light
42 Reagent well
42a Cut-out portion
44 Sensor chip loading hole
44a Holding portion
46 Holding region
48 Fluorescence
50 Light receiving unit
52 Light shielding member
54 Laser diode (LD)
56 Collimating lens
58 Polarizing plate
60 Short pass filter
62 Aperture
64 APC optical system
66 APC photodiode
68 Beam splitter
100 SPFS system
101 SPFS apparatus
102 Dielectric member
102a Upper surface
102b Incidence surface
102c Emission surface
104 Metal film
106 Reaction layer
108 Channel
110 Channel forming member
112 Channel lid member
114 Sensor chip
116 Sensor chip loading portion
118 Fluorescence
120 Light receiving unit
122 Light source
124 Excitation light
124b Emission surface reflected light
126 Light absorbing portion
128 Excitation light cut filter

The invention claimed is:

1. An optical sample detection system comprising:
   a sensor chip including:
      a dielectric member, the dielectric member having an upper surface, a first side surface and a second side surface;
      a metal film adjacent to the upper surface of the dielectric member;
      a reaction layer adjacent to an upper surface of the metal film; and
      a lid member disposed on an upper surface of the reaction layer;
   a chip loader including a chip holder for holding the sensor chip; and
   a light projecting unit that irradiates the metal film with excitation light through the dielectric member, the light projecting unit being disposed on a first side surface side of the sensor chip, the light projecting unit being configured to emit the excitation light toward the first side surface as an incidence surface of the dielectric member, the optical sample detection system detecting a sample by irradiating the metal film with the excitation light through the dielectric member, wherein
   the lid member has a larger width than the width of the dielectric member in an optical path cross section of the excitation light,
   the dielectric member is dimensioned such that the excitation light incident on the incidence surface of the dielectric member is incident on the metal film for detection, and then reflected from the metal surface toward the second side surface as an emission surface of the dielectric member, the emission surface being configured and dimensioned to: (a) emit excitation light reflected from the metal surface to outside the dielectric member, and (b) reflect emission surface reflected light, such that the emission surface reflected light travels towards the incidence surface, the dielectric member being dimensioned such that the emission surface reflected light is emitted, at the incidence surface, to an outside of the dielectric member at an angle so that the light emitted at the incidence surface is not incident on the lid member within a measurement scanning angle of the excitation light.

2. The optical sample detection system according to claim 1, wherein the incidence surface and the emission surface of the dielectric member are each a smooth surface, and an angle $\theta_a$ formed by a surface adjacent to the metal film of the dielectric member and the incidence surface is different from an angle $\theta_b$ formed by the surface adjacent to the metal film of the dielectric member and the emission surface.

3. The optical sample detection system according to claim 2, wherein the angle $\theta_b$ formed by the surface adjacent to the metal film and the emission surface is larger than the angle $\theta_a$ formed by the surface adjacent to the metal film and the incidence surface.

4. The optical sample detection system according to claim 1, wherein
the incidence surface and the emission surface of the dielectric member are each a smooth surface, and
in at least a part within a measurement scanning angle of the excitation light, an angle $\theta_a$ formed by a surface adjacent to the metal film and the incidence surface, an angle $\theta_b$ formed by the surface adjacent to the metal film and the emission surface, and a refractive index $n_1$ of the dielectric member satisfy the following formula:

[Mathematical Formula 1]

$$\frac{n_1}{n_0} \cdot \frac{\sin(\theta_a + 2\theta_b - \theta)}{\cos \theta_a} \leq \cos \theta_a \quad (1)$$

where $\theta$ represents an incidence angle of the excitation light on the metal film, and $n_0$ represents a refractive index of the dielectric member on an excitation light incident side of the incidence surface.

5. The optical sample detection system according to claim 1, wherein an emission angle of the emission surface reflected light on the incidence surface coincides with a reflection angle of the excitation light on the incidence surface within a measurement scanning angle of the excitation light.

6. The optical sample detection system according to claim 1, wherein the emission surface reflected light travels straight from the emission surface toward the incidence surface and is emitted to an outside of the dielectric member.

7. The optical sample detection system according to claim 1, wherein the sensor chip and the light projecting unit are positioned by contact of a holding region of the lid member with the chip holder.

8. The optical sample detection system according to claim 1, wherein the sensor chip further includes a reagent well.

9. The optical sample detection system according to claim 8, wherein
the reagent well is made of a material having translucency with respect to the excitation light, and
the emission surface reflected light is not incident on the reagent well within a measurement scanning angle of the excitation light.

10. The optical sample detection system according to claim 8, wherein the sensor chip and the light projecting unit are positioned by contact of a holding region of the reagent well with the chip holder.

11. The optical sample detection system according to claim 8, wherein a cut-out is formed in a part of the reagent well in an optical path cross section of the excitation light.

12. The optical sample detection system according to claim 1, wherein a cut-out is formed in a part of the lid member in an optical path cross section of the excitation light.

13. The optical sample detection system according to claim 1, wherein the light amount of the emission surface reflected light is larger than the light amount of the excitation light by more than 2%.

14. The optical sample detection system according to claim 1, further comprising
a light shielding member, wherein
the light shielding member is irradiated with the emission surface reflected light emitted from the incidence surface.

15. The optical sample detection system according to claim 2, wherein
the incidence surface and the emission surface of the dielectric member are each a smooth surface, and
in at least a part within a measurement scanning angle of the excitation light, an angle $\theta_a$ formed by a surface adjacent to the metal film and the incidence surface, an angle $\theta_b$ formed by the surface adjacent to the metal film and the emission surface, and a refractive index $n_1$ of the dielectric member satisfy the following formula:

[Mathematical Formula 1]

$$\frac{n_1}{n_0} \cdot \frac{\sin(\theta_a + 2\theta_b - \theta)}{\cos \theta_a} \leq \cos \theta_a \quad (1)$$

where $\theta 0$ represents an incidence angle of the excitation light on the metal film, and $n_0$ represents a refractive index of the dielectric member on an excitation light incident side of the incidence surface.

16. The optical sample detection system according to claim 2, wherein an emission angle of the emission surface reflected light on the incidence surface coincides with a reflection angle of the excitation light on the incidence surface within a measurement scanning angle of the excitation light.

17. The optical sample detection system according to claim 2, wherein the emission surface reflected light travels straight from the emission surface toward the incidence surface and is emitted to an outside of the dielectric member.

18. The optical sample detection system according to claim 2, wherein the sensor chip and the light projecting unit are positioned by contact of a holding region of the lid member with the chip holder.

19. An optical sample detection system comprising:
a sensor chip including:
a dielectric member;
a metal film adjacent to an upper surface of the dielectric member;
a reaction layer adjacent to an upper surface of the metal film; and
a lid member disposed on an upper surface of the reaction layer;
a chip loader including a chip holder for holding the sensor chip; and
a light projecting unit that irradiates the metal film with excitation light through the dielectric member, the optical sample detection system detecting a sample by irradiating the metal film with the excitation light through the dielectric member, wherein
the lid member has a larger width than the width of the dielectric member in an optical path cross section of the excitation light, and
emission surface reflected light emitted to an outside of the dielectric member after the excitation light is reflected by an emission surface of the dielectric member is not incident on the lid member within a measurement scanning angle of the excitation light, wherein a bottom surface of the dielectric member is a scattering surface.

20. An optical sample detection system comprising:

a sensor chip including:
- a dielectric member;
- a metal film adjacent to an upper surface of the dielectric member;
- a reaction layer adjacent to an upper surface of the metal film; and
- a lid member disposed on an upper surface of the reaction layer;

a chip loader including a chip holder for holding the sensor chip; and a light projecting unit that irradiates the metal film with excitation light through the dielectric member, the optical sample detection system detecting a sample by irradiating the metal film with the excitation light through the dielectric member, wherein the lid member has a larger width than the width of the dielectric member in an optical path cross section of the excitation light, and emission surface reflected light emitted to an outside of the dielectric member after the excitation light is reflected by an emission surface of the dielectric member is not incident on the lid member within a measurement scanning angle of the excitation light, wherein a bottom surface of the dielectric member is a non-flat surface.

* * * * *